(12) United States Patent
Yoakim

(10) Patent No.: US 6,966,251 B2
(45) Date of Patent: Nov. 22, 2005

(54) AUTOMATIC DEVICE FOR THE EXTRACTION OF A SUBSTANCE

(75) Inventor: Alfred Yoakim, St-Legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 78 days.

(21) Appl. No.: 10/877,985

(22) Filed: Jun. 29, 2004

(65) Prior Publication Data

US 2004/0231521 A1 Nov. 25, 2004

Related U.S. Application Data

(63) Continuation of application No. PCT/EP02/00325, filed on Jan. 10, 2002.

(51) Int. Cl.[7] .................................................. A47J 31/24
(52) U.S. Cl. ...................................... 99/295; 99/302 R
(58) Field of Search ............................. 99/295, 302 R, 99/323

(56) References Cited

U.S. PATENT DOCUMENTS

| | | | |
|---|---|---|---|
| 3,260,190 A | 7/1966 | Levinson ...................... | 99/295 |
| 3,470,812 A | 10/1969 | Levinson ...................... | 99/295 |
| 4,846,052 A | 7/1989 | Favre et al. ................... | 99/295 |
| 5,402,707 A | 4/1995 | Fond et al. .................... | 99/295 |
| 5,656,316 A | 8/1997 | Fond et al. .................. | 426/433 |
| 5,897,899 A | 4/1999 | Fond .......................... | 426/112 |
| 6,025,000 A | 2/2000 | Fond et al. .................. | 426/433 |
| 6,026,732 A | 2/2000 | Kollep et al. ................. | 99/295 |
| 6,068,871 A | 5/2000 | Fond et al. .................. | 426/433 |
| 6,182,554 B1 * | 2/2001 | Beaulieu et al. .......... | 99/289 R |
| 6,240,832 B1 * | 6/2001 | Schmed et al. ........... | 99/289 R |
| 6,345,570 B1 * | 2/2002 | Santi ......................... | 99/289 R |
| 2003/0077359 A1 | 4/2003 | Fond et al. .................... | 426/77 |

FOREIGN PATENT DOCUMENTS

| | | |
|---|---|---|
| EP | 0 087 550 A2 | 9/1983 |
| EP | 0 242 556 | 10/1987 |
| EP | 0 512 468 B1 | 11/1992 |
| EP | 0 602 203 B1 | 6/1994 |
| EP | 0 891 734 B1 | 1/1999 |
| EP | 1 050 258 B1 | 11/2000 |
| EP | 1 089 240 A2 | 4/2001 |
| FR | 1410288 | 8/1965 |

* cited by examiner

Primary Examiner—Reginald L. Alexander
(74) Attorney, Agent, or Firm—Winston & Strawn LLP

(57) ABSTRACT

The present invention relates to a device for the extraction of a substance for preparing a beverage from a capsule, comprising a chassis (11) with a horizontal flat part (22) and a vertical part (14) at the rear of the chassis; a drawer (5) which can be moved in horizontal translation over the flat part of the chassis between an open position and a closed position and which comprises, in the drawer, a capsules (10) housing unit (6) with at least one housing (21) for the capsule which is to be extracted and a pin (18) for holding on each side of the housing unit and secured thereto; a fixed capsule-extraction head (4) mounted on the chassis with at least one capsule cage (20), the cage facing the housing for the capsule when the drawer is in the closed position; and holding member ABCD making it possible, when the drawer is in the closed position, to raise the capsule housing unit using the holding pin so as to bring the capsule that is to be extracted into the capsule cage.

23 Claims, 8 Drawing Sheets

AUTOMATIC DEVICE FOR THE EXTRACTION OF A SUBSTANCE

This is a continuation of International Application PCT/EP02/00325, filed Jan. 10, 2002, the contents of which are hereby incorporated herein by reference thereto.

FIELD OF THE INVENTION

The present invention relates to an automatic device for the extraction of a substance for preparing a beverage from a capsule.

Numerous devices for extracting a substance from an open or closed capsule already exist on the market. Patent EP 0 242 556 already relates to a device for the extraction of closed cartridges in a cartridge holder, in which device the said cartridge holder is engaged on an extraction head therefore allowing extraction and making it possible to obtain the desired beverage. The problem with this device is that the consumer has to place the capsule in the cartridge holder and then engage the said cartridge holder on the extraction head. It is this last operation which causes the problems, because the cartridge holder has to be engaged precisely and clamped firmly enough to ensure a good seal for extraction.

SUMMARY OF THE INVENTION

The present invention makes available to the consumer a device in which the handling operations that the consumer performs are reduced to the minimum and in which the device is closed automatically without any human intervention, thus setting aside any risk of lack of sealing.

The present invention relates to a device for the extraction of a substance for preparing a beverage from a capsule, comprising
- a chassis with a horizontal flat part and a vertical part at the rear of the said chassis,
- a drawer which can be moved in horizontal translation over the flat part of the chassis between an open position and a closed position and which comprises, in the said drawer, a capsule housing unit with at least one housing for the capsule which is to be extracted and a pin for holding on each side of the housing unit and secured thereto,
- a fixed capsule-extraction head mounted on the chassis with at least one capsule cage, the said cage facing the housing for the capsule when the drawer is in the closed position,
- holding means making it possible, when the drawer is in the closed position, to raise the capsule housing unit using the holding pin so as to bring the capsule that is to be extracted into the capsule cage.

It is just as possible, in the device according to the invention, to extract closed capsules, such as those described in Patent EP 0 512 468 and EP 0 602 203. It is also possible to use the device to extract other sachets, closed cartridges or capsules. It is also possible to use the device according to the invention for open capsules, for example capsules made of plastic or sachets made of filter paper and of nonwovens.

The substance contained in the closed or open capsule or the like, is a powdered substance for preparing a beverage. This substance is preferably roasted ground coffee, but may also be tea, instant coffee, a mixture of ground coffee and instant coffee, a chocolate product or any other dehydrated edible substance.

It is possible, with the device according to the invention, to have a capsule housing unit comprising several housings for the capsule that is to be extracted. This means that it is possible, in a single go, to obtain 1, 2, 3 or more cups of coffee: this system would be particularly advantageous in cafes, restaurants and other public places where simultaneous demands for cups of coffee may be great. As a preference, a device with 1 to 4 housings is provided.

In the preferred embodiment, the extraction head is fixed. This is because it is this part which is mechanically the most complicated, because of the water inlet. By contrast, the drawer with the capsule housing unit can move: reliable and effective holding means are needed.

These holding means preferably include:
- two pulling rods and a lifting bar on each side of the fixed extraction head and secured to the fixed vertical part at the rear of the chassis, so as to form two deformable quadrilaterals, each lifting bar comprising a hook designed to engage over the holding pin secured to the housing unit when the drawer is in the closed position and a drive rod connecting the two quadrilaterals, and
- a cam system able to act on the drive rod to deform the quadrilaterals and thus allow the lifting bar to raise the capsule, housing unit towards the fixed extraction head.

When the consumer has filled the drawer with the capsule or capsules that is or are to be extracted, the said drawer closes in a translational movement: this distance through which it translates is at least twice the diameter of the capsule that is to be extracted.

Furthermore, when the drawer is closed, the holding means allow the capsule housing unit to be raised through an angle at least equal to the height of the capsule that is to be extracted, that is to say an angle of the order of 10 to 20°.

As already mentioned hereinabove, it is just as possible to extract open capsules as closed capsules. If open capsules are extracted, nothing need be added to the present device according to the invention. By contrast, if closed capsules are extracted, that is to say capsules which open through an increase in pressure, it is preferably ensured that the capsule that is to be extracted is a closed capsule, in which case each extraction head comprises a capsule cage with either a needle with water inlet or a water inlet with blades to make it possible to perforate the upper part of the capsule that is to be extracted.

Still in the case of closed capsules, it is necessary for the bottom of the housing for the capsule to be extracted to comprise recessed and raised elements that allow the bottom of the capsule to open through the rise in pressure in the said capsule.

BRIEF DESCRIPTION OF THE DRAWINGS

The remainder of the description is given with reference to the drawings in which.

DETAILED DESCRIPTION OF THE PREFERRED EMBODIMENTS

Figure 1:
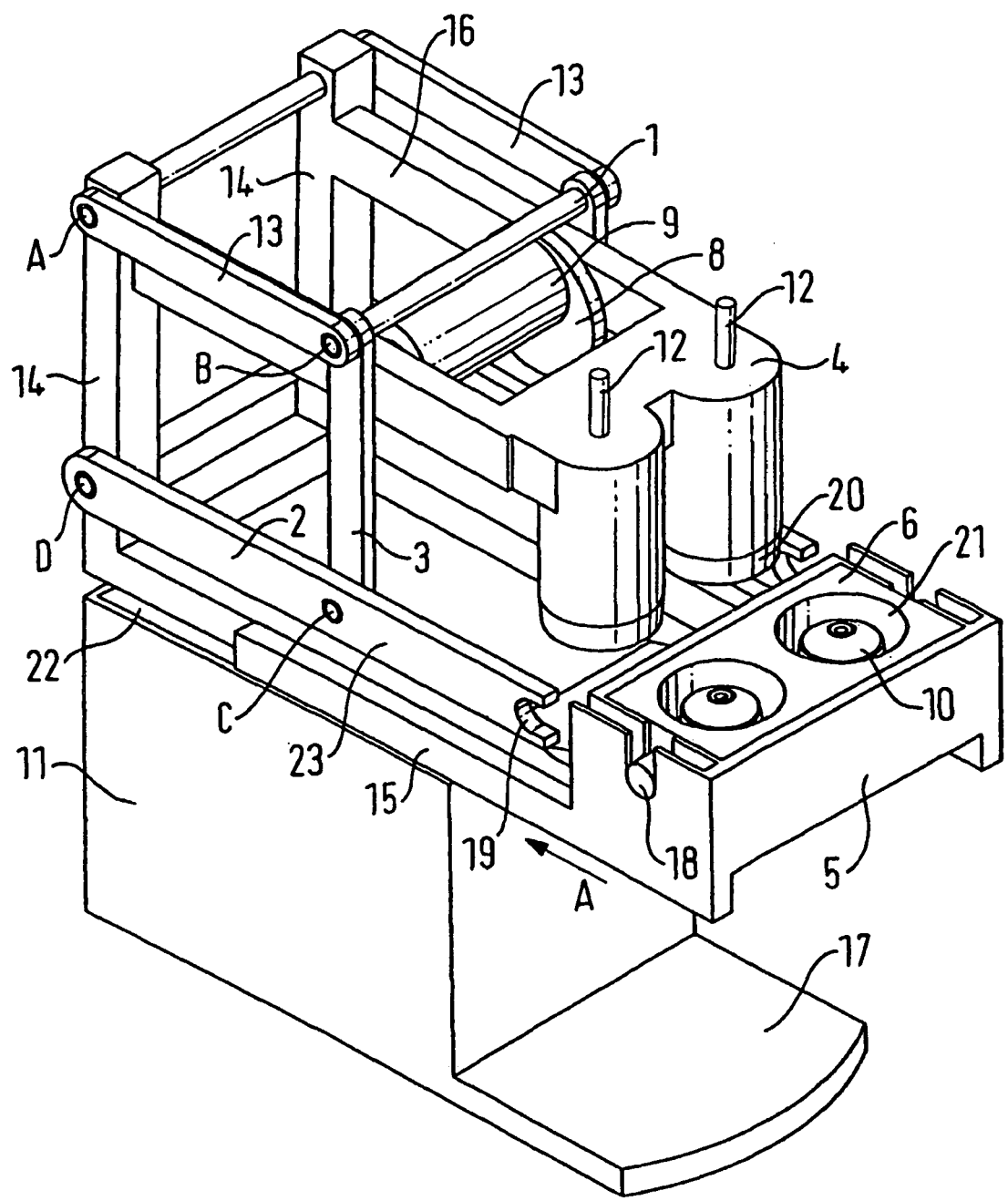
FIGS. 1 to 6 are perspective views of the device according to the invention during the various phases of the extraction of a capsule, the said device comprising a capsule housing unit with two housings.
Figure 2:
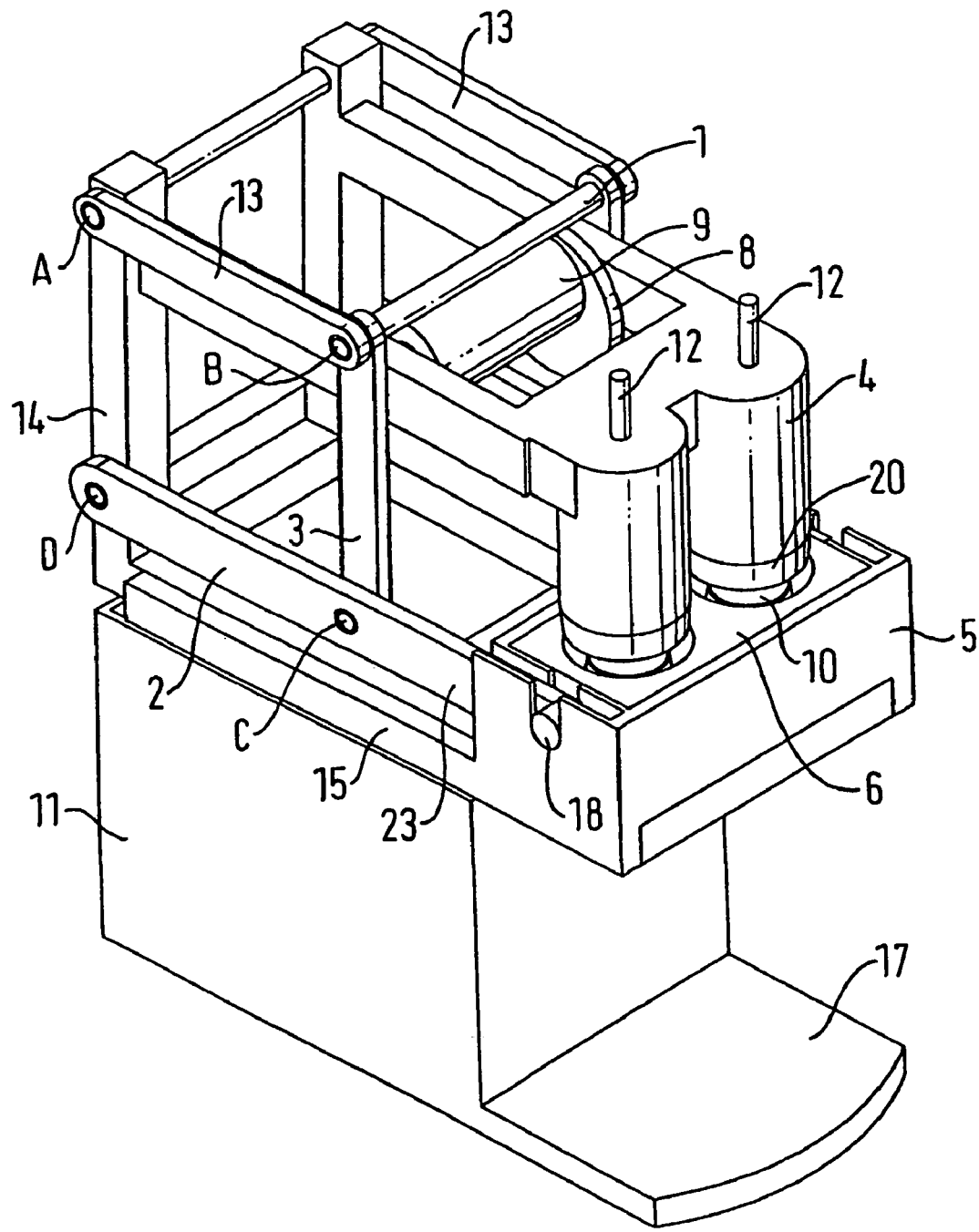

A preferred embodiment of the device comprises a chassis (11) with a horizontal part (22) and a vertical part (14) at the rear of the said chassis. The drawer (5) comprising a capsules (10) housing unit (6) can move in horizontal translation over the aforementioned horizontal part (22) via a guide (15) secured to the said drawer (5). The capsule housing unit (6) comprises, on each side of the said system, a pin (18) for holding. The fixed extraction head (4) is secured to the vertical part (14) at the rear of the chassis (11) by a connecting bar (16), the said head comprising a capsule cage (20). The holding means consist of two deformable quadrilaterals ABCD each comprising a first pulling rod (13) secured at A to the vertical part (14), a second pulling rod (3) secured at B to the first pulling rod (13), and a lifting bar (2) secured at C to the second pulling rod (3) and secured at D to the vertical part (14). The lifting bar (2) comprises an extension (23) provided with a hook (19) capable of engaging over the holding pin (18) of the capsule housing unit (6). In order to move the holding means, there is a cam (8) comprising a motor (9), the said cam being placed between the two connecting bars (16) of the fixed extraction head (4). Finally, the drive rod (1) arranged between—the two quadrilaterals ABCD collaborates with the cam (8) to raise the lifting bar (2).

Figure 3:
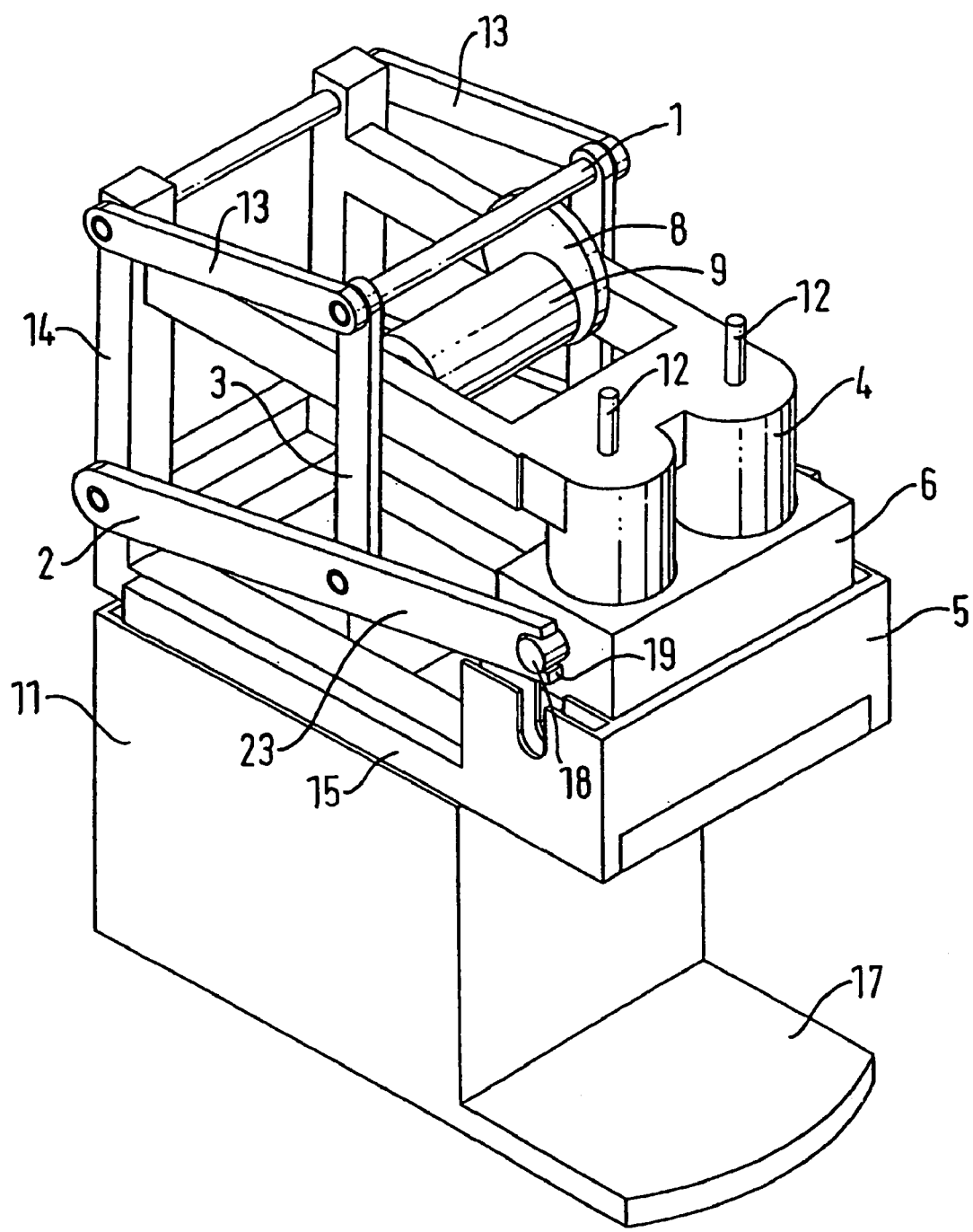
Figure 4:
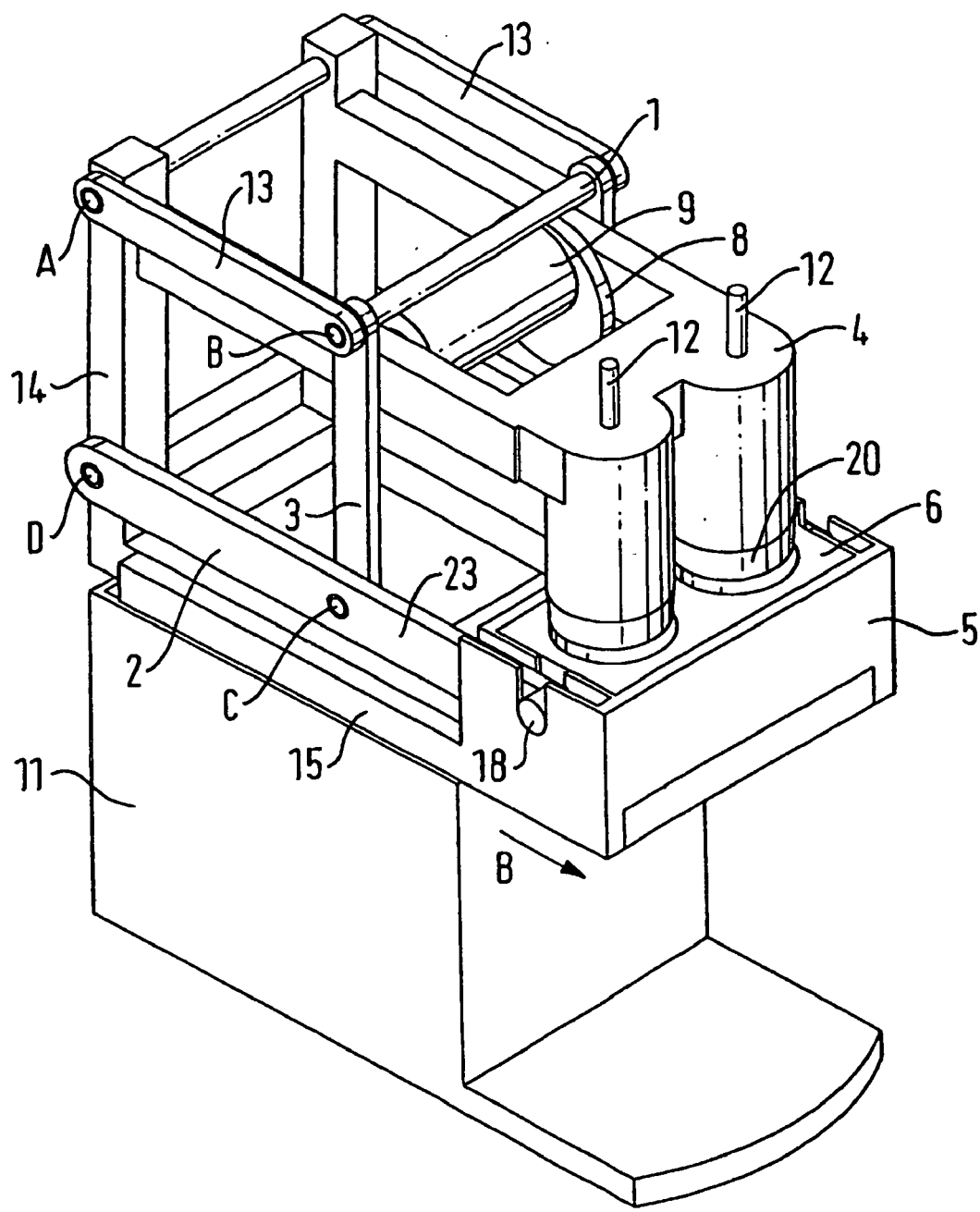
Figure 5:
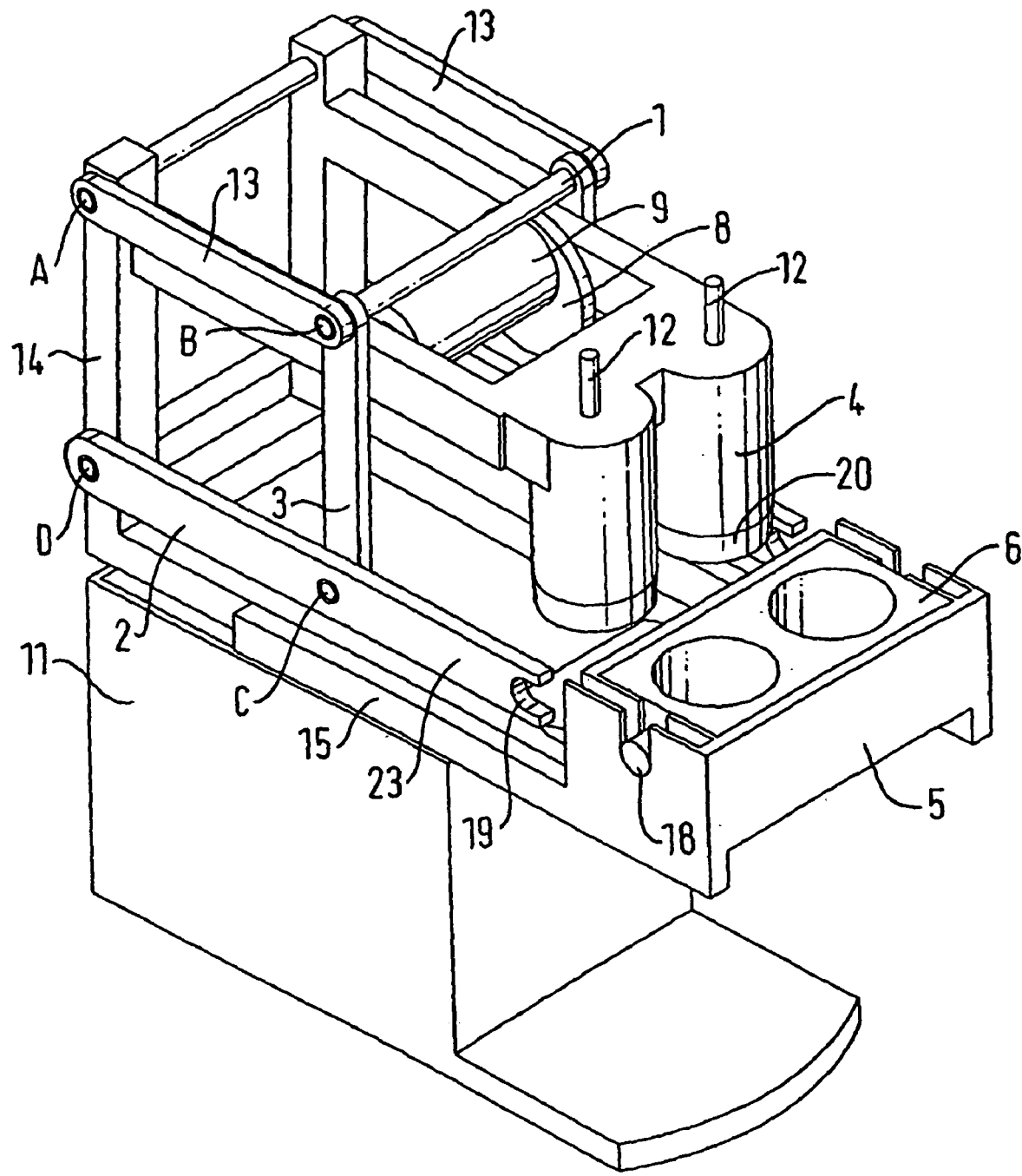
Figure 6:
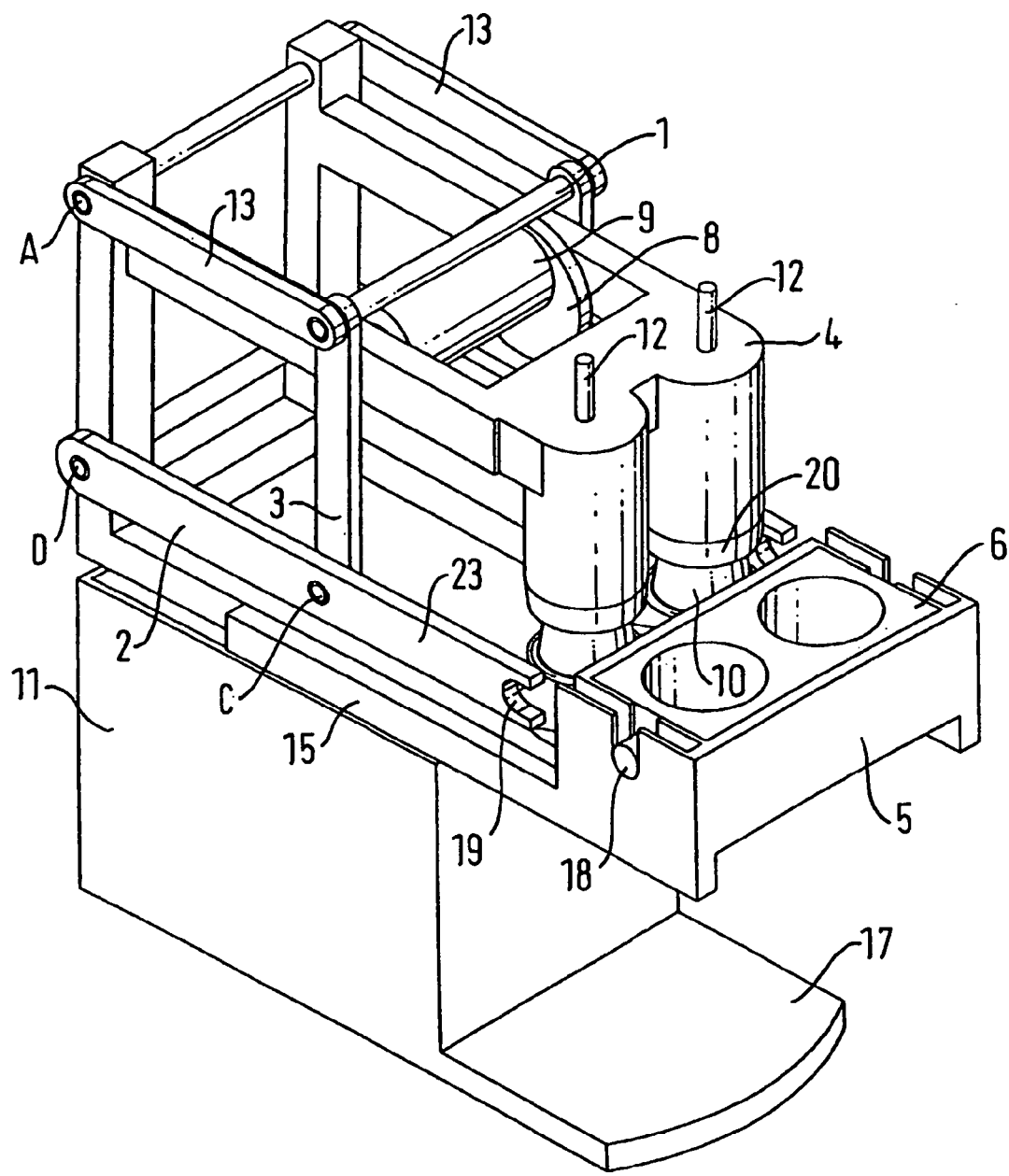

The way in which the device works is as follows, following the various phases from FIG. 1 to FIG. 6: in the arrangement of FIG. 1, the consumer places the two capsules (10) that are to be extracted into the housings (21). At this time, a cell (not depicted) begins the process of the extraction of the said capsules: the drawer (5) closes in a transitional movement in the direction of the arrow A, the guide (15) sliding over the horizontal part (22) of the chassis (11). During this movement, the hook (19) of the lifting bar (2) will engage on the holding pin (18) of the housing unit (6). When the drawer reaches the end of its travel, this is the arrangement of FIG. 2. At that moment, it is the cam (8) which will come into action to lift the capsule housing unit (6): the motor (9) starts the cam (8). In its rotational movement, it will push against the drive rod (1) so as to deform the quadrilateral ABCD, that is to say so that the lifting bar (2) raises the capsule housing unit (6) against the capsule cage (20). When the cam reaches the end of its travel, the system is adequately sealed and hot water arrives through the pipes (12), passes into the capsule (10) to flow into the two cups placed on the front part (17) of the chassis. This extraction step is depicted in FIG. 3. At the end of extraction, the motor (9) causes the cam (8) to turn to allow the lifting bar (2) and, at the same time, the capsule housing unit (6) to drop back down again. This then is the arrangement of FIG. 4. At the same time as the lifting bar (2) is dropping back down, means (not depicted) for holding the capsule in the capsule cage (20) are actuated so that the drawer (5) can open without the used capsules. Next, the drawer (5) opens in the direction of the arrow B, resulting in the arrangement of FIG. 5: the capsule is still in the capsule cage (20), held in by the aforementioned retaining means. These means are, for example, a finger for each capsule: cage (20). Finally, FIG. 6 shows the disengagement of the capsule (10) from the capsule cage to allow the said extracted capsule to drop into the lower reservoir of the chassis (11): to do this, the retaining finger retracts to release the capsule. The device is thus ready to be refilled with two fresh capsules (10) for extraction. If the consumer wants just one coffee, he loads just one capsule and the water arriving through the pipe (12) will reach only one single capsule cage (20). On the other hand, it is also possible according to the invention to provide 3, 4 and possibly even more capsule cages (20) per device.

Figure 7:
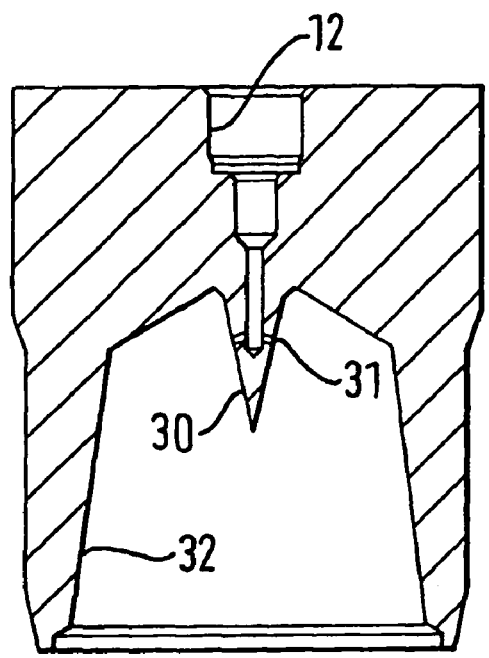
FIG. 7 is a section through a capsule cage in a first embodiment.
Figure 8:
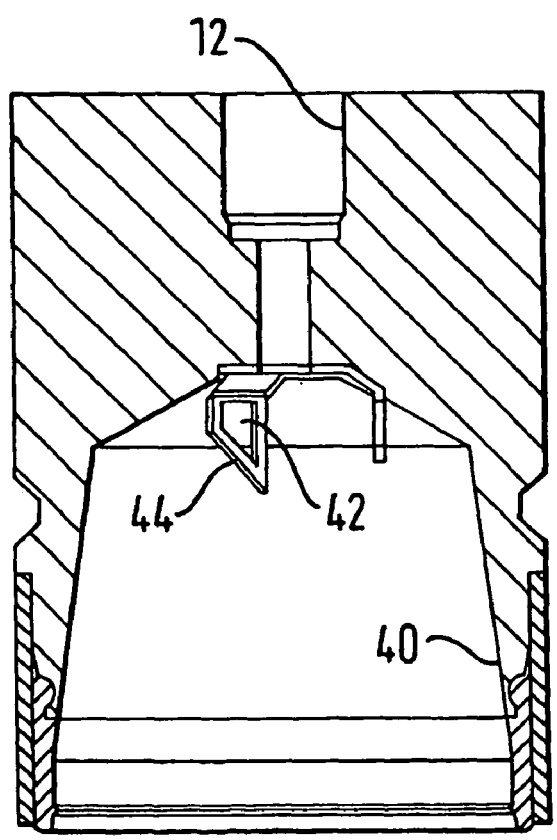
FIG. 8 is a section through a capsule cage in a second embodiment.
Figure 9:
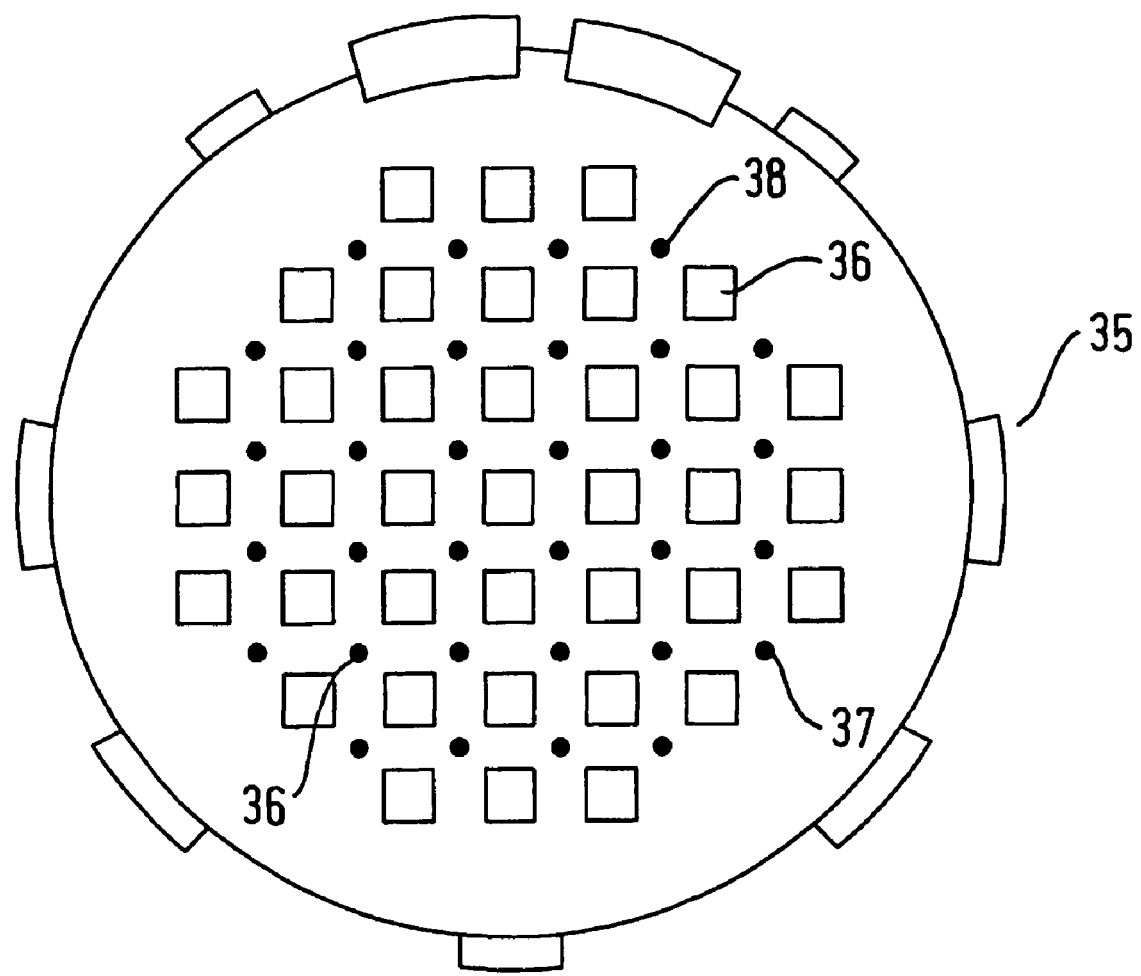
FIG. 9 is a schematic depiction of the bottom of a housing for a capsule that is to be extracted.

FIGS. 7 and 8 give part sections of two embodiments of the capsule cage. The cage in FIG. 7 shows the water inlet pipe (12) and the water injection needle (30). The capsule (10) to be extracted is in the housing (32) and the needle (30) pierces the top of the said capsule. Hot water arrives through the pipe (12) and through the holes (31) in the needle (30). When the capsule cage is closed, this is the position of the aforementioned FIG. 3. FIG. 9 shows the bottom of the capsule housing (35). This bottom has raised (36) and recessed (37) elements. It is in the recesses that the orifices (38) that allow the coffee to pass are to be found. When the water arrives in the capsule (10) there is an increase in pressure in the said capsule, and this presses the bottom of the capsule firmly against the raised (36) and recessed (37) elements, and when the rupture tension is reached, the film of the bottom of the capsule tears on the said raised and recessed elements and coffee passes and runs through the orifices (38).

FIG. 8 shows a second form of embodiment—of a capsule cage. The pipe (12) allows hot water to arrive and the said cage comprises a housing (40) for the capsule that is to be extracted. In the housing, there is a piercing system (41) with perforated blades (42). When the capsule is closed, this is the position of the aforementioned FIG. 3: the top of the capsule is pierced by the blades (42), the water arrives through the pipe (12) and the increase in pressure in the capsule will cause the lower membrane of the said capsule to tear against the raised and recessed elements visible in FIG. 9. When the capsule cage of FIGS. 8 and 9 is used, the capsule housing bottom can be the same, namely that of FIG. 9.

What is claimed is:

1. A device for extracting a substance from at least one capsule for preparing beverages, comprising:
    a chassis;
    a drawer translatively associated with the chassis for translating between open and closed drawer positions;
    a housing unit comprising at least one housing configured for holding a capsule containing the substance to be extracted and having an open housing position, in which the housing unit is associated with the drawer for translating with the drawer, and having a closed housing position;
    an extraction head associated with the chassis and configured for receiving at least one capsule from the housing with the housing in the closed housing position, the extraction head being configured for extracting the substance from the capsule received therein; and
    a housing positioner operably associated with the housing for moving the housing between the open and closed housing positions, wherein the housing positioner is associated with the housing unit with the drawer in the closed drawer position for lifting the housing from the drawer to the closed housing position.

2. The device of claim 1, wherein the housing positioner is configured to move the housing unit from the housing open position to the housing closed position with the drawer in the closed drawer position.

3. The device of claim 2, wherein the housing positioner is configured to move the housing unit from the closed housing position to the open housing position with the drawer in the closed drawer position.

4. The device of claim 3, wherein the positioner is configured for lowering the housing unit to the open housing position on the drawer in the closed drawer position.

5. The device of claim 1, wherein the positioner is configured and disposed for engaging the housing unit with the drawer in the closed drawer position and disengaging the housing in the open drawer position.

6. The device of claim 1, wherein the housing in the open housing position with the drawer in the open drawer position is user accessible for placing the at least one cartridge therein.

7. The device of claim 1, wherein the housing is configured for receiving a cartridge having a predetermined dimension measured in parallel to a direction in which the drawer translated from the open drawer position to the closed drawer positions, the drawer being translatable by at least about twice said dimension from the open drawer position to the closed drawer position.

8. The device of claim 1, wherein the housing is configured for receiving a cartridge having a predetermined height measured in a direction in which the positioner moves the housing unit from the open to the closed position and at most being about equal to the distance by which the positioner moves the housing unit from the open to the closed position.

9. The device of claim 1, wherein the extraction head comprises a fluid inlet configured for directing a fluid into the capsule for extracting the substance.

10. The device of claim 9, wherein the extraction head comprises a perforation member that comprises a needle or blade configured for perforating the capsule for directing the fluid therein.

11. The device of claim 10, wherein the extraction head comprises recessed and raised elements configured to open the capsule under pressure from the fluid for extraction of the substance and fluid.

12. A device for extracting a substance from at least one capsule for preparing beverages, comprising:
   a chassis;
   a drawer translatively associated with the chassis for translating between open and closed drawer positions;
   a housing unit comprising at least one housing configured for holding a capsule containing the substance to be extracted and having an open housing position, in which the housing unit is associated with the drawer for translating with the drawer, and having a closed housing position;
   an extraction head associated with the chassis and configured for receiving at least one capsule from the housing with the housing in the closed housing position, the extraction head being configured for extracting the substance from the capsule received therein; and
   a housing positioner operably associated with the housing for moving the housing between the open and closed housing positions, wherein the housing unit comprises a plurality of housings.

13. A device for extracting a substance from at least one capsule for preparing beverages, comprising:
   a chassis;
   a drawer translatively associated with the chassis for translating between open and closed drawer positions;
   a housing unit comprising at least one housing configured for holding a capsule containing the substance to be extracted and having an open housing position, in which the housing unit is associated with the drawer for translating with the drawer, and having a closed housing position;
   an extraction head associated with the chassis and configured for receiving at least one capsule from the housing with the housing in the closed housing position, the extraction head being configured for extracting the substance from the capsule received therein; and
   a housing positioner operably associated with the housing for moving the housing between the open and closed housing positions, wherein the positioner comprises an arm that is pivotally associated with the chassis and that is pivotable for moving the housing unit between the open and closed positions.

14. The device of claim 13, further comprising a cam in camming association with the arm for causing the arm to pivot.

15. The device of claim 14, further comprising a four-bar linkage associated with the chassis and comprising the arm, wherein the cam is configured for actuating the four-bar linkage.

16. A device for the extraction of a substance for preparing a beverage from a capsule, comprising:
   a chassis with a generally horizontal flat portion and a generally vertical portion at the rear of the said chassis;
   a drawer that is movable in generally horizontal translation over the flat portion of the chassis between an open position and a closed position and which comprises, in the drawer, a capsule housing unit with at least one housing for the capsule which is to be extracted and a pin for holding on each side of the housing unit and secured thereto;
   a fixed capsule-extraction head mounted on the chassis with at least one capsule cage that faces the housing when the drawer is in the closed position; and
   a positioner configured to raise the capsule housing unit using the holding pin when the drawer is in the closed position to bring the capsule that is to be extracted into the capsule cage.

17. The device according to claim 16, in which the capsule housing unit comprises from one to four housings for capsules to be extracted.

18. The device according to claim 16, in which the positioner comprises:
   two pulling rods and a lifting bar on two sides of the fixed extraction head and secured to the fixed vertical part at the rear of the chassis to form two deformable quadrilaterals, each lifting bar comprising a hook designed to engage the holding pin secured to the housing unit when the drawer is in the closed position and a drive rod connecting the two quadrilaterals,
   a cam system configured to act on the drive rod to deform the quadrilaterals to cause the lifting bar to raise the capsule housing unit towards the fixed extraction head.

19. The device according to claim 16, in which the distance through which the drawer translates is at least twice the diameter of the capsule that is to be extracted.

20. The device according to claim 16, in which the positioner is configured to raise the capsule housing unit through an angle at least equal to the height of the capsule that is to be extracted.

21. The device according to claim 16, in which the capsule that is to be extracted is an open capsule.

22. The device according to claim 16, in which the capsule that is to be extracted is a closed capsule, and each extraction head comprises a capsule cage including a needle with a water inlet or including a water inlet with blades to perforate the upper part of the capsule.

23. The device according to claim 22, in which the bottom of the housing for the capsule that is to be extracted comprises recessed and raised elements that cause the bottom of the capsule to open due to a rise in pressure in the said capsule.

* * * * *